(12) United States Patent
Siripragada

(10) Patent No.: US 12,292,794 B2
(45) Date of Patent: May 6, 2025

(54) TECHNIQUES FOR MANAGING MEMORY EXCEPTION HANDLING

(71) Applicant: Micron Technology, Inc., Boise, ID (US)

(72) Inventor: Santhosh Kumar Siripragada, Telangana (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/397,399

(22) Filed: Dec. 27, 2023

(65) Prior Publication Data

US 2024/0241788 A1   Jul. 18, 2024

Related U.S. Application Data

(60) Provisional application No. 63/439,793, filed on Jan. 18, 2023.

(51) Int. Cl.
*G06F 11/10* (2006.01)
*G06F 3/06* (2006.01)
*G06F 11/07* (2006.01)

(52) U.S. Cl.
CPC ........ *G06F 11/1068* (2013.01); *G06F 3/0619* (2013.01); *G06F 3/0656* (2013.01); *G06F 3/0679* (2013.01); *G06F 11/0772* (2013.01)

(58) Field of Classification Search
None
See application file for complete search history.

(56) References Cited

U.S. PATENT DOCUMENTS

| | | | | |
|---|---|---|---|---|
| 8,555,027 B2* | 10/2013 | Kimura | ............... | G06F 12/0246 714/6.32 |
| 10,114,578 B2* | 10/2018 | Li | ........................ | G06F 11/1048 |
| 11,362,685 B2* | 6/2022 | Hirano | .............. | H03M 13/6566 |
| 2010/0174951 A1* | 7/2010 | Yamashita | .......... | G06F 12/0246 711/E12.001 |
| 2013/0117632 A1* | 5/2013 | Fujinami | ............. | G06F 11/1012 714/763 |
| 2014/0372667 A1* | 12/2014 | Tan | ..................... | G06F 11/1048 711/103 |

(Continued)

OTHER PUBLICATIONS

D. Lee et al., "Improving Write Performance Through Reliable Asynchronous Operation in Physically-Addressable SSD," in IEEE Access, vol. 8, pp. 195528-195540, 2020, (Year: 2020).*

*Primary Examiner* — Daniel F. McMahon
(74) *Attorney, Agent, or Firm* — Holland & Hart LLP

(57) ABSTRACT

Methods, systems, and devices for techniques for managing memory exception handling are described. A memory device may write first data associated with a first access command to a first portion of a buffer of a memory device. The memory device may determine a programming failure to write second data to a page of a first block of the memory device. In response to determining the programming failure, the memory device may perform an access operation associated with the first access command to vacate the first data from the first portion of the buffer. In response, the memory device may write the second data to the first portion of the buffer. The memory device may write the second data from the first portion of the buffer to a page of a second block of the memory device in response to writing the second data to the first portion of the buffer.

20 Claims, 5 Drawing Sheets

(56) References Cited

U.S. PATENT DOCUMENTS

| | | | |
|---|---|---|---|
| 2021/0223994 A1* | 7/2021 | Kanno | G06F 3/0679 |
| 2021/0311826 A1* | 10/2021 | Senoo | G11C 16/0483 |
| 2022/0130485 A1* | 4/2022 | Hwang | G11C 29/78 |
| 2022/0229585 A1* | 7/2022 | Kang | G06F 3/0652 |
| 2022/0261186 A1* | 8/2022 | Oh | G06F 3/0679 |
| 2024/0070067 A1* | 2/2024 | Choi | G06F 3/0656 |

* cited by examiner

TECHNIQUES FOR MANAGING MEMORY EXCEPTION HANDLING

CROSS REFERENCE

The present Application for Patent claims priority to and the benefit of U.S. Provisional Application No. 63/439,793 by Siripragada, entitled "TECHNIQUES FOR MANAGING MEMORY EXCEPTION HANDLING," filed Jan. 18, 2023, assigned to the assignee hereof, and is expressly incorporated by reference in its entirety herein.

TECHNICAL FIELD

The following relates to one or more systems for memory, including techniques for managing memory exception handling.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not- or (NOR) and not- and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
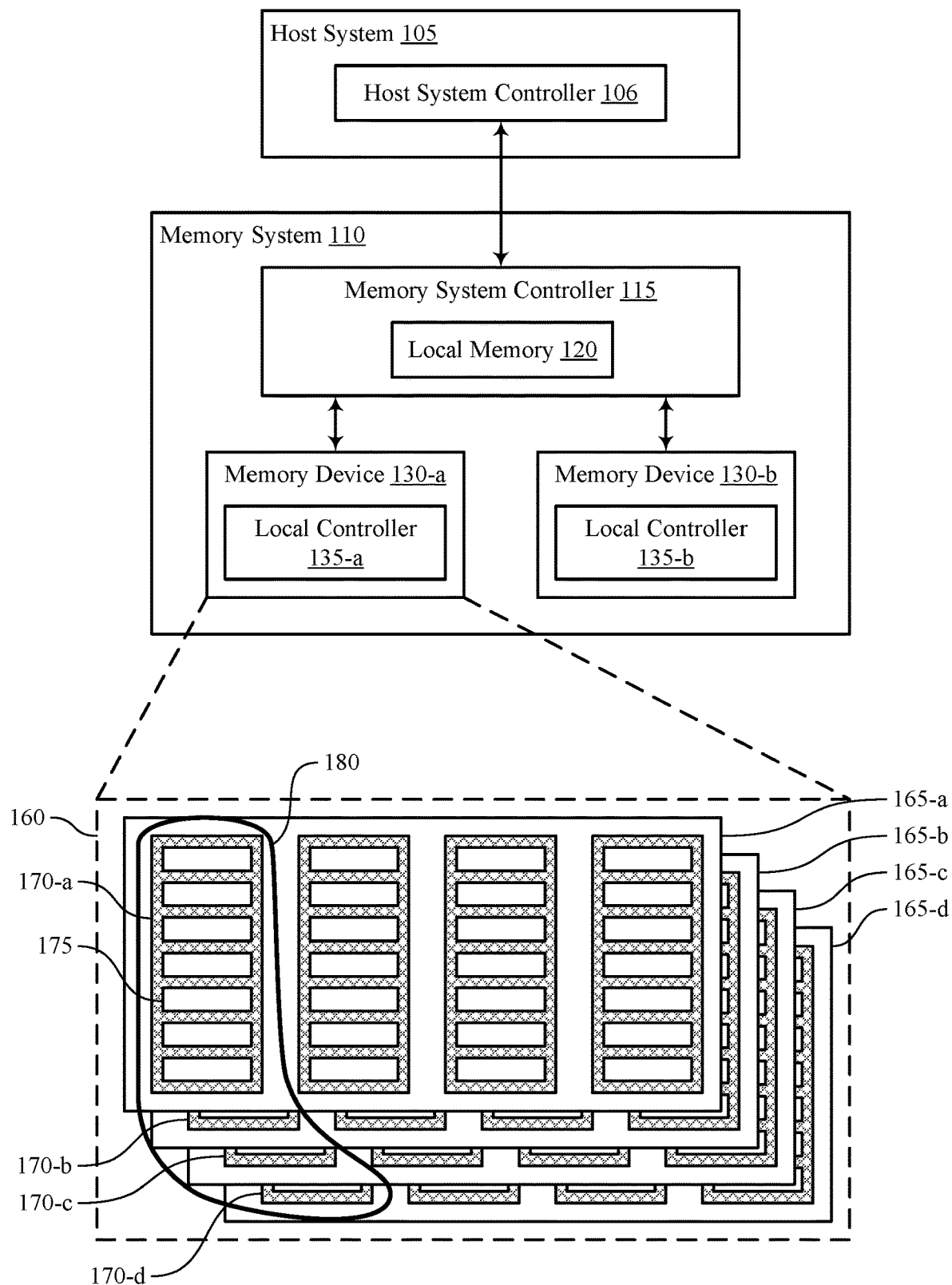
FIGS. 1 and 2 illustrate examples of systems that support techniques for managing memory exception handling in accordance with examples as disclosed herein.

A memory system may allocate a portion of volatile memory (e.g., such as random access memory (RAM)) to manage data associated with programming failures. For example, a controller of the memory system may be configured to receive, from a host system, one or more access commands to read data from a block of memory cells or to write data to a block of memory cells. In the case of a read operation, the controller may retrieve the data from the block of memory cells, store the data in a register associated with the block of memory cells, and move the data from the register to volatile memory (e.g., temporarily store the data in volatile memory) until the data is to be transmitted to the host system. In the case of a write operation (e.g., a write access command), the controller may temporarily store data associated with the write operation in the volatile memory until the data is to be written to a block of memory cells. At the time the data is to be written to the block of memory cells, the controller may transfer (e.g., move, shift, relocate) the data from the volatile memory to a register (e.g., latch) associated with the block of memory cells and write the data from the register to a page of the block of memory cells.

In some cases, while performing various access commands, the controller may identify a programming failure to write data to a block of memory cells. In such cases, the controller may pause (e.g., stop or terminate) the execution of one or more additional access commands on the memory system, identify the page of the block of memory cells where the programming failure occurred, and transfer (e.g., move, shift, relocate) the data (e.g., the data intended for the identified page) from the register (e.g., latch) associated with the failed block into the allocated portion of the volatile memory for managing data associated with programming failures. The controller may identify a new block of memory cells to store the data, move the data from the allocated portion of volatile memory to the register associated with the new block, and write the data from the register to the new block of memory cells. The controller may proceed to relocate data from one or more pages of the block of memory cells that experienced a programming failure to one or more pages of the new block using the allocated portion of volatile memory. However, in some cases, the allocated portion of volatile memory for managing programming failures may become relatively large (e.g., relative to the total size of the volatile memory) due to multiple programming failures. As such, the performance of the volatile memory may be degraded due to the increased memory allocation for managing programming failures and decreased memory allocation to perform one or more access commands, thereby decreasing the performance of the memory system.

The techniques described herein may provide improved techniques for managing memory exception handling. That is, rather than using the allocated portion of volatile memory for managing programming failures, the controller may reuse a portion of the volatile memory previously allocated for a different access command in order to manage the data associated with the programming failure. For example, the controller may be configured to receive a first access command and temporarily store data associated with the first access command to a first portion of the volatile memory (e.g., buffer). While doing so, the controller may perform a second access command to write data to a first block of memory cells. The controller may determine a programming failure in writing the data to a page of the first block of memory cells.

In response to determining the programming failure, the controller may continue to perform the first access operation (e.g., with a target to pause execution of access operations) in order to vacate the data from the first portion of the volatile memory, such that the controller may transfer (e.g., move, shift, relocate) the data associated with the programming failure from the register of the first block of memory cells to the vacated first portion of the volatile memory. The controller may identify a new block of memory cells to store the data and write the data from the first portion of the volatile memory to a page of the new block of memory cells. The controller may use the first portion of the volatile memory in order to transfer (e.g., move, shift, relocate) data from one or more pages of the first block of memory cells (e.g., the block that experienced the programming failure) to the new block of memory cells. In this way, the controller may reuse the vacated first portion of the volatile memory for managing data associated with programming failures, thereby eliminating an allocated portion of volatile memory to manage data associated with programming failures.

Figure 2:
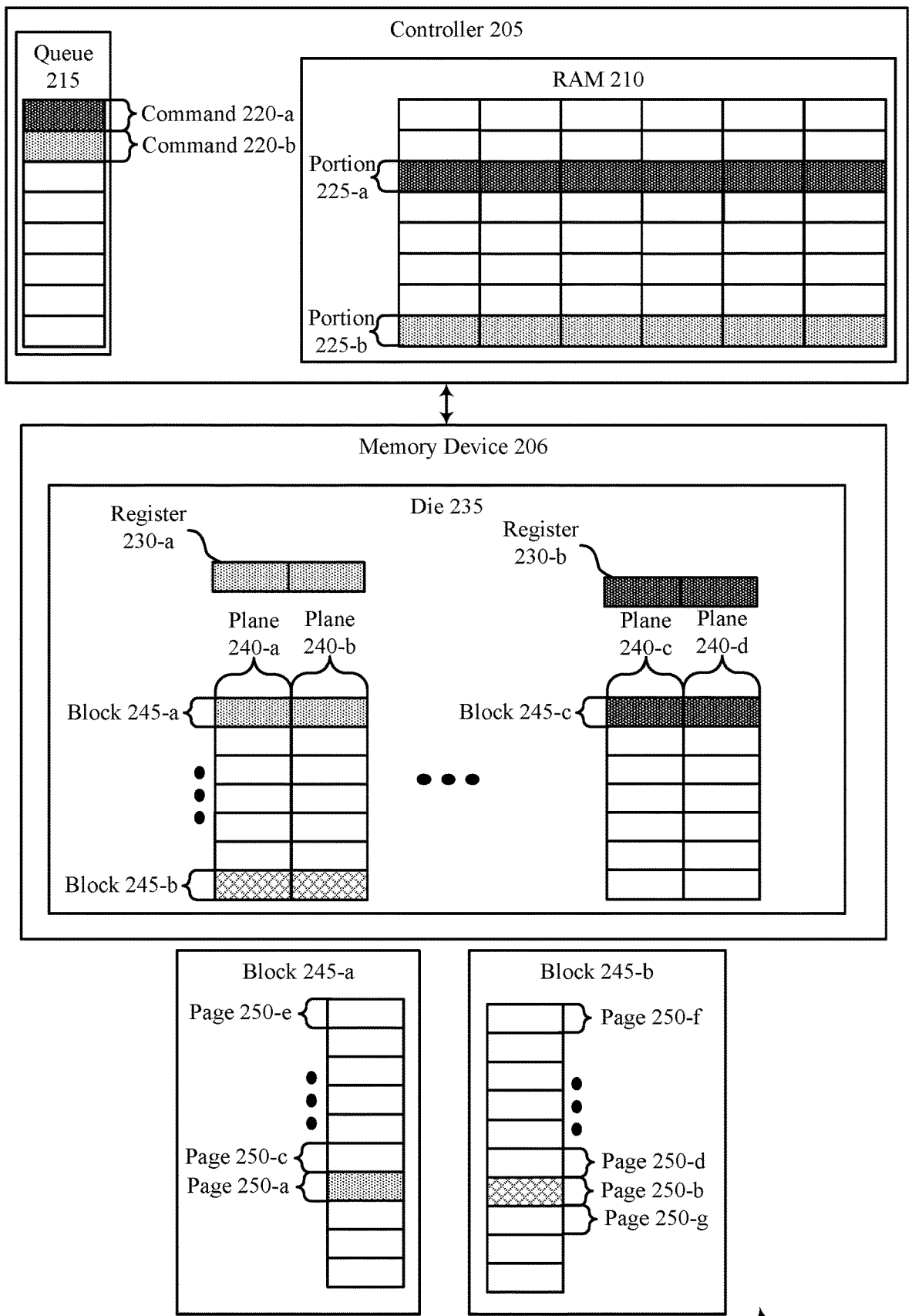

Features of the disclosure are initially described in the context of systems, devices, and circuits with reference to FIGS. 1 and 2. Features of the disclosure are described in the context of a process flow with reference to FIG. 3. These and other features of the disclosure are further illustrated by and described in the context of an apparatus diagram and flowchart that relate to techniques for managing memory exception handling with reference to FIGS. 4 and 5.

FIG. 1 illustrates an example of a system 100 that supports techniques for managing memory exception handling in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric RAM (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

The system 100 may include any quantity of non-transitory computer readable media that support techniques for managing memory exception handling. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

The memory system 110 may dedicate a portion of the local memory 120 (e.g., RAM) to manage data associated with programming failures of one or more blocks 170. For example, the memory system controller 115 may receive, from the host system 105, one or more access commands to perform access operations on one or more memory devices 130, such as read data from a block 170 or to write data to a block 170. In the case of a read operation, the memory system controller 115 may be configured to retrieve the data from the block 170-a, store the data in a register associated with the block 170-a, and move (e.g., transfer, relocate) the data from the register to the local memory 120 (e.g., temporarily store the data in the local memory 120) until the data is to be transmitted to the host system 105. In the case of a write operation (e.g., a write access command), the memory system controller 115 may temporarily store data associated with the write operation in the local memory 120 until the data is to be written to the block 170-a. At the time the data is to be written to the block 170-a, the memory system controller 115 may move the data from the local memory 120 to a register (e.g., latch) associated with the block 170-a and then write the data from the register to a page 175 of the block 170-a.

In some cases, while performing various access commands, the memory system controller 115 may identify a programming failure to write data to a block 170. In such cases, the memory system controller 115 may pause the execution of one or more additional access commands on the memory devices 130, identify a page 175 of the block 170 where the programming failure occurred, and move (e.g., transfer, relocate) the data (e.g., the data intended for the identified page) from the register (e.g., latch) associated with the failed block 170 into a dedicated portion of the local memory 120 that is allocated for managing data associated with programming failures. The memory system controller 115 may identify a new block 170 to store the data, move (e.g., transfer, relocate) the data from the dedicated portion of the local memory 120 to the register associated with the new block 170, and write the data from the register to the new block 170. The memory system controller 115 may proceed to relocate data from one or more pages 175 of the block 170 that experienced a programming failure to one or more pages 175 of the new block 170 using the dedicated portion of local memory 120. However, in some cases, the dedicated portion of local memory 120 for managing programming failures may become relatively large (e.g., relative to the total size of the local memory 120) due to the memory system controller 115 allocating more memory for managing data for multiple programming failures. As such, the performance of the local memory 120 may be degraded due to the increased memory allocation for managing programming failures and decreased memory allocation to perform one or more access commands, thereby decreasing the performance of the memory system 110.

The techniques described herein may provide improved techniques for managing memory exception handling. That is, rather than using a dedicated portion of local memory 120 for managing programming failures, the memory system controller 115 may reuse a portion of the local memory 120 previously allocated for a different access command in order to manage the data associated with the programming failure. For example, the memory system controller 115 may be configured to receive a first access command and temporarily store data associated with the first access command to a first portion of the local memory 120 (e.g., buffer). While doing so, the memory system controller 115 may perform a second access command to write data to the block 170-a. The memory system controller 115 may determine a programming failure in writing the data to a page 175 of the block 170-a.

In response to determining the programming failure, the memory system controller 115 may continue to perform the first access operation in order to vacate the data from the first portion of the local memory 120, such that the memory system controller 115 may move (e.g., transfer, relocate) the data associated with the programming failure from the register of the block 170-a to the vacated first portion of the local memory 120. The memory system controller 115 may identify a new block 170 to store the data and write the data from the first portion of the local memory 120 to a page 175 of the new block 170. The memory system controller 115 may use the first portion of the local memory 120 in order to move data from one or more pages 175 of the block 170-a (e.g., the block that experienced the programming failure) to the new block 170. In this way, memory system controller 115 may reuse the vacated first portion of the local memory 120 for managing data associated with programming failures, thereby eliminating a dedicated portion of local memory 120 for use in managing data associated with programming failures.

FIG. 2 illustrates an example of a system 200 that supports techniques for managing memory exception handling in accordance with examples as disclosed herein. Aspects of the system 200 may implement, or be implemented by, aspects of the system 100. For example, the system 200 may be an example of a memory system 110 and may include a controller 205 and a memory device 206, which may be examples of corresponding devices described herein with reference to FIG. 1.

The controller 205 may include a queue 215, which may be used to store one or more access commands 220 received from a host system (not shown). The controller 205 may also include a RAM 210 (e.g., buffer), in which portions 225 of the RAM 210 may be allocated to facilitate one or more access operations associated with the access commands 220. The controller 205 may be communicatively coupled with the memory device 206 via a bus or circuitry in order to perform such access operations, such as read data from the memory device 206 or write data to the memory device 206. The memory device 206 may include a die 235 (e.g., although one die 235 is shown in FIG. 2 it is to be understood that the memory device 206 may include multiple dies 235), in which the die 235 may include one or more planes 240. Each plane 240 may be associated with a respective register 230 (e.g., NAND latch), which may be used by the controller 205 to facilitate access operations on the planes 240. Each plane 240 may include one or more blocks 245, where each block 245 may contain one or more pages 250 (e.g., pages of memory cells). A page 250 of each block 245 may contain a set of memory cells, in which the controller 205 may write data to or read data from. The die 235, planes 240, blocks 245, and pages 250) may be examples of dies 160, planes 165, blocks 170, and pages 175 as described herein with reference to FIG. 1.

For example, the controller 205 may be configured to receive an access command 220)-a (e.g., a first access command) from the host system and store the access command 220-a in the queue 215. In some cases, the access command 220-a may be a write command to write data to a page 250 of a block 245. In such cases, the controller 205 (e.g., or a resource manager of the system 200) may allocate a portion 225-a of the RAM 210, such that the controller 205 may receive the data associated with the access command 220-a from the host system and temporarily store the data in the portion 225-a of the RAM 210. The controller 205 may identify a block 245-c to store the data. In response to identifying the block 245-c, the controller 205 may write the data from the portion 225-a of the RAM 210 to a register 230-b associated with the plane 240-c and the plane 240-d in which the block 245-c is located. The controller 205 may then perform the write operation associated with the access command 220-a and write the data from the register 230-b to a page 250 of the block 245-c, thereby completing the write operation associated with the access command 220-a.

In some other cases, the access command 220-a may be a read access command. In such cases, the controller 205 may identify the location (e.g., a page 250) of the block 245-c) of the data associated with the read access command, retrieve the data from the page 250) of the block 245-c and store the data in the register 230-b. The controller 205 may allocate the portion 225-a in the RAM 210 to temporarily store the data prior to being transmitted to the host system. In response to allocating the portion 225-a, the controller 205 may move (e.g., transfer, relocate) the data from the register 230-*b* to the portion 225-*a* of the RAM 210. The controller 205 may then transmit the data from the portion 225-*a* of the RAM 210 to the host system, thereby completing the read operation associated with the access command 220)-a.

In some cases of the system 200, the controller 205 may allocate a portion 225-*b* of the RAM 210 for managing data associated with programming failures. Allocating the portion of the RAM 210 for programming failures may exclude that portion of the RAM 210 from being used for access operations. Techniques are described for re-using portions of the RAM 210 used for access operation to use for programming failures. In such examples, the portion of the RAM 210 allocated for programming failures may be reduced if these techniques are used. The controller 205 may receive the access command 220-*a* to perform an access operation on the memory device 206 (e.g., to either read data from, or write data to, the memory device 206) and receive an access command 220-*b* to write data to a page 250-*a* of a block 245-*a*. The controller 205 may perform the access operation associated with the access command 220-*a* and the write operation associated with the access command 220-*b* in parallel (e.g., simultaneously, concurrently, at the same time). In some cases, the controller 205 may fail to write to the data associated with the access command 220-*b* to the page 250-*a* of the block 245-*a*. That is, the controller 205 may determine a programming failure associated with writing the data to the page 250-*a* of the block 245-*a*. The programming failure may occur, for example, due to degradation of the page 250-*a*, the block 245-*a*, or both caused by one or more read disturb mechanisms (e.g., multiple write operations to the page 250-*a* of the block 245-*a*).

In response to the programming failure occurring, the controller 205 may pause execution of the access command 220-*a* on the die 235 (e.g., and pause further access operations on the die 235). The controller 205 (e.g., using a NAND status) may identify the plane 240-*a* and 240-*b* where the programming failure occurred and read back the data (e.g., intended for page 250-*a*) from the register 230-*a* associated with the plane 240-*a* and the plane 240-*b* to the portion 225-*b* of RAM 210 (e.g., the dedicated portion of RAM 210) used for managing programming failures. The controller may then identify a block 245-*b* (e.g., a spare block) to replace the failed block 245-*a*. In response to identifying the block 245-*b*, the controller 205 may write the data associated with the programming failure from the portion 225-*b* to the register 230-*a* and write the data from the register 230-*a* to the page 250-*b* of the block 245-*b*. The controller 205 may then relocate the data in pages 250-*c* through 250-*e* of the block 245-*a* to pages 250 of the block 245-*b* via the portion 225-*b*, thereby completing the exception handling procedure.

In some cases, the portion 225-*b* of RAM 210 allocated for managing programming failures may be relatively large (e.g., relative to the total size of the RAM 210) due to the controller 205 allocating more dedicated portions 225 of memory for managing data for programming failures. As such, the performance of the RAM 210 may be degraded due to the increased memory allocation for managing programming failures and decreased memory allocation to perform one or more access commands 220, thereby decreasing the performance of the system 200.

In some implementations of the system 200, rather than using the portion 225-*b* (e.g., dedicated portion of RAM 210) for managing programming failures, the controller 205 may reuse the portion 225-*a* previously allocated for the access command 220-*a* in order to manage the data associated with the programming failure associated with the access command 220-*b*. For example, the controller 205 may receive, from the host system, the access command 220-*a*. In response, the controller 205 may allocate the portion 225-*a* of the RAM 210 (e.g., first portion of the buffer) for first data associated with the access command 220)-a and write the first data to the portion 225-*a*. The controller 205 may receive the access command 220-*b* to write second data to the page 250-*a* of the block 245-*a* (e.g., a page of the first block). In response, the controller 205 may allocate a portion of the RAM 210 to temporarily store the second data associated with the access command 220-*b*, write the second data to the allocated portion, write the second data to the register 230)-a associated with the plane 240-*a* and the plane 240-*b*, and release the second data from the allocated portion of the RAM 210.

The controller 205 may attempt to write the second data from the register 230-*a* to the page 250-*a* of the block 245-*a*. However, the controller 205 may determine a programming failure (e.g., has occurred) to write the second data from the register 230-*a* to the page 250-*a* of the block 245-*a*. In response to determining the programming failure, the controller 205 may perform (e.g., complete) the access operation associated with the access command 220)-a in order to vacate the first data from the portion 225-*a* of the RAM 210. In some examples, the controller 205 may perform one or more additional access operations associated with additional access commands 220 in the queue 215 in order to vacate data from the RAM 210.

In response to completing the one or more access operations, the controller 205 may pause execution of other access commands on the die 235 and pause one or more additional incoming operations (e.g., access commands 220) from the host system. The controller 205 may then allocate portions of the RAM 210 (e.g., buffer) from the resource reserve to manage program failure read operations. That is, the controller 205 may allocate (e.g., reuse) at least the portion 225-*a* of the RAM 210 to manage data associated with the programming failure. The controller 205 (e.g., using NAND status) may identify the plane 240-*a* and the plane 240-*b* where the failed program operation occurred and may read back the NAND content (e.g., data intended for page 250)-a) from the register 230-*a* (e.g., NAND latches) to the portion 225-*a* of the RAM 210 allocated, for example, from a recourse server (not shown) (e.g., allocated to manage programming failures). That is, in response to allocating the portion 225-*a* for managing programming failures, the controller 205 may write (e.g., move) the second data from the register 230-*a* to the portion 225-*a* in response to the first data being vacated from the portion 225-*a* (e.g., in response to performing the access operation associated with the access command 220-*a*).

The controller 205 may identify a spare block (e.g., the block 245-*b*) to replace the failed block (e.g., the block 245-*a*) and relocate the data of the block 245-*a* to the block 245-*b*, along with the recovered (e.g., second) data. To relocate the data from the block 245-*a* to the block 245-*b*, the controller 205 may write the second data from portion 225-*a* to the register 230-*a* and write the data from the register 230-*a* to the page 250-*b* of the block 245-*b*, where the page 250-*b* may correspond (e.g., location wise) to the page 250-*a*. The controller 205 may release the second data from the portion 225-*a* of the RAM 210 and acquire one page 250) worth of buffers from the resource server (not shown) and relocate data from the old block 245-*a* to the new block 245-*b* in descending or ascending order from page 250-*c* to page 250-*e*. That is, if page 250)-a is where the programming failure occurred (e.g., page N), then the controller 205 may write the data from page 250-*c* (e.g., N−1) of the block 245-*a* to page 250)-d (e.g., the page directly preceding the page 250)-b and continue the process until all the pages 250 of the block 245-*a* have been written to the block 245-*b* (e.g., N−1 to 0)). After writing the data from the last page 250 of the block 245-*a* to the last page 250 of the block 245-*b*, the controller 205 may exit exception handling and continue one or more additional access operations (e.g., write operations) on the block 245-*b* starting at page 250-*g* (e.g., N+1 location). In such cases, the controller 205 may un-pause the execution of other access operations and resume executing the access operations included in the queue 215.

For example, in response to writing the second data from the portion 225-*a* to the page 250)-b of the block 245-*b*, the controller 205 may be configured to move the data from the one or more pages 250 preceding the page 250-*a* of the block 245-*a* (e.g., move data from page 250-*c* to page 250-*e* of the block 245-*a*) to one or more pages 250 preceding the page 250-*b* of the block 245-*b* (e.g., move the data to page 250-*d* through page 250-*f* of block 245-*b*). To facilitate such operations, the controller 205 may be configured to temporarily store the data in the one or more pages 250 preceding page 250)-a in the portion 225-*a* of the RAM 210. For example, the controller 205 may write the data from page 250-*c* to the portion 225-*a*, write such data from portion 225-*a* to the register 230-*a*, and write the data from the register 230-*a* to the page 250-*d* of block 245-*b*. Subsequently, the controller 205 may release the data of 250-*c* from the portion 225-*a* and continue such operations in descending order until all the data from the block 245-*a* is transferred to corresponding pages 250 of the block 245-*b*. Alternatively, the controller 205 may be configured to perform such operations in ascending order. That is, in response to writing the second data from the page 250-*a* to the page 250)-b, the controller 205 may write the data from page 250)-e to the portion 225-*a* and write such data from the portion 225-*a* to the page 250-*f*. The controller 205 may continue such operations until the data from the one or more pages 250) preceding the page 250)-a (e.g., identified page 250 associated with the programming failure) is written to corresponding pages 250) of the block 245-*b*. In some other cases, the controller 205 may initiate a maintenance operation to relocate the data from the one or more pages preceding the page 250)-a to corresponding pages 250) of the block 245-*b*.

In this way, the system 200 may be unable to use a dedicated portion 225-*b* of the RAM 210 for program failure handling. As such, the controller 205 may use a portion 225-*a* of the RAM 210 that is equal to the width of a page 250 of the die 235, in favor of allocating a large portion 225 of the RAM 210 for managing programming failures. Further, such techniques may eliminate the controller 205 from performing additional buffer copies and may enable the controller 205 to perform the exception handling relatively quicker, which may result in earlier exits for exception handling. Additionally, in some cases, the relocation of data from the old block 245 (e.g., failed block 245) to the spare block 245 may be delayed and retriggered as the maintenance operation (e.g., such as a garbage collection operation, wear leveling operation, refresh operation, or the like). In this way, the controller 205 may be enabled to perform one or more access commands 220 (e.g., host operations) on the spare block 245 after writing the second data from the old block 245 to the spare block 245 (e.g., starting at the N+1 location). The techniques described herein may be used in cases where the memory device 206 (e.g., NAND device) supports programming pages 250 of the block 245 in incremental and decremental order.

Figure 3:
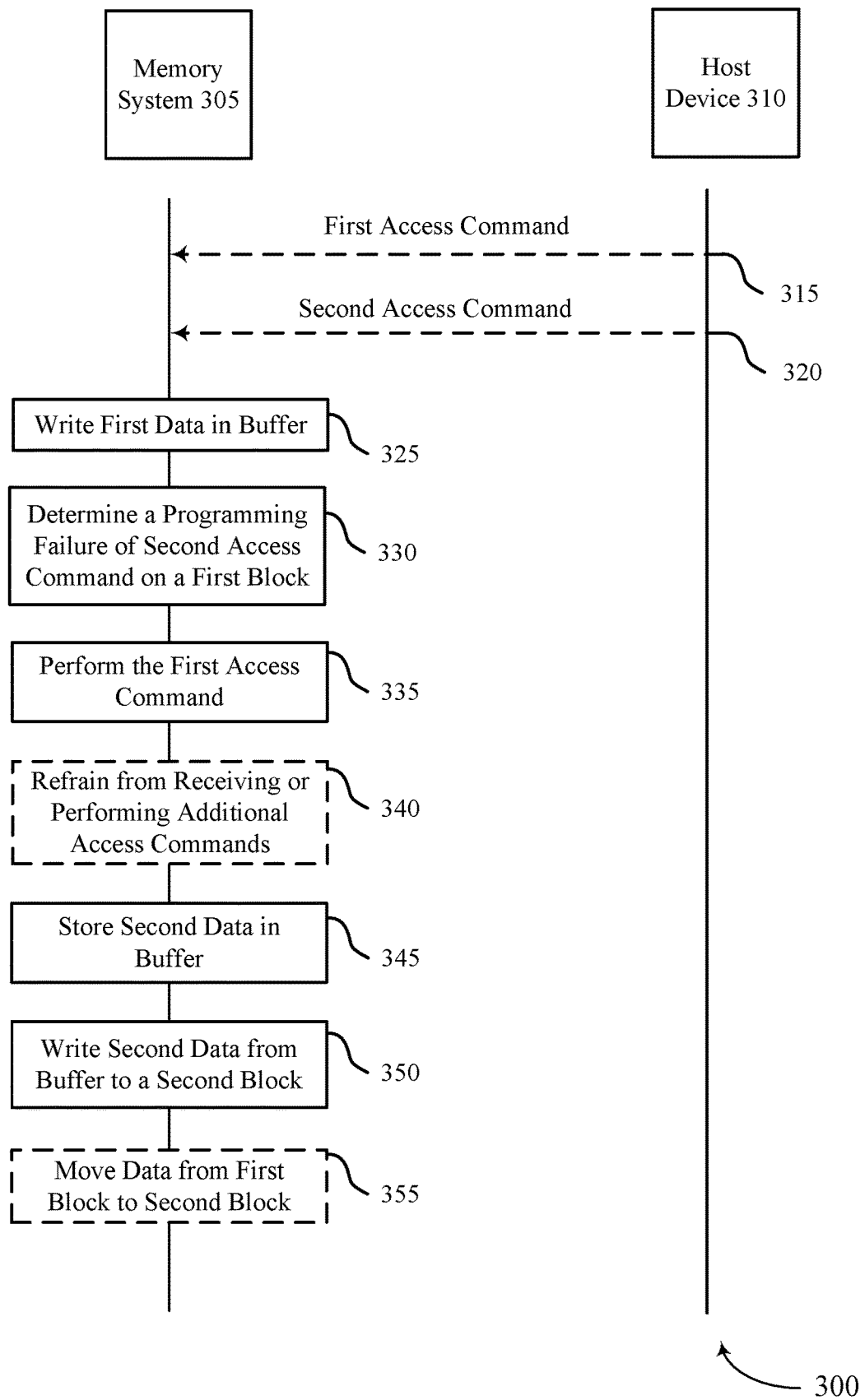
FIG. 3 illustrates an example of a process flow that supports techniques for managing memory exception handling in accordance with examples as disclosed herein.

FIG. 3 illustrates an example of a process flow 300 that supports techniques for managing memory exception handling in accordance with examples as disclosed herein. Aspects of the process flow 300 may be implemented by a controller, among other components. Additionally, or alternatively, aspects of the process flow 300 may be implemented as instructions stored in memory (e.g., firmware stored in a memory coupled with a processor or resource manager). For example, the instructions, if executed by a controller (e.g., a resource manager), may cause the controller to perform the operations of the process flow 300. The process flow 300 may implement, or be implemented by, aspects of the system 100 and the system 200 as described herein. For example, the process flow 300 may include a memory system 305 and a host system 310, which may be examples of corresponding devices described herein with reference to FIGS. 1 and 2. Additionally, such operations of the process flow 300 may be implemented by controllers of the respective devices.

At 315, a first access command may be received. For example, a controller of the memory system 305 may be configured to receive a first access command associated with an access operation to either read first data from one or more blocks of memory cells of a memory device or write first data to one or more blocks of memory cells of the memory device. At 320, a second access command may be received. For example, the controller may be configured to receive a second access command associated with a write operation to write second data (e.g., data different than the first data) to a first block of memory cells (e.g., the first block of memory cells may be an example of non-volatile blocks 170 and blocks 245 described herein with reference to both FIG. 1 and FIG. 2).

At 325, the first data associated with the first access command may be written to a first portion of the buffer. For example, in response to receiving the first access command, the controller of the memory system 305 may allocate the first portion of the buffer (e.g., one or more memory cells in volatile memory such as RAM) in order to perform the access operation associated with the first access command. As such, the controller may write the first data to the allocated first portion of the buffer.

At 330, a programming failure may be determined. That is, the controller of the memory system 305 may attempt to write the second data associated with the second access command to the first block of memory cells and determine a programming failure to write the second data to a page of the first block of memory cells. For example, the controller of the memory device may write the second data associated with the second access command to a register (e.g., latch) associated with the first block of memory cells. The controller may attempt to write the second data from the register to the page of the first block of memory cells. In such examples, the controller may determine a programming failure to write the second data from the register associated with first block of memory cells to the page of the first block of memory cells.

At 335, an access operation may be performed. That is, in response to determining the programming failure to write the second data to the page of the first block, the controller may perform the access operation associated with the first access command in order to vacate the first data from the first portion of the buffer. In some examples, the controller of the memory system 305 may perform one or more additional access operations in order to vacate data (e.g., data other than the first data) from the buffer in response to determining the programming failure of the second data. The controller of the memory system 305 may allocate the first portion of the buffer in order to write the second data associated with the programming failure in response to vacating at least the first data from the first portion of the buffer. In some examples, the controller may allocate additional portions (e.g., such as a second or third portion) of the buffer to manage the second data associated with the programming failure in response to performing the one or more additional access operations to vacate data from the buffer.

At 340, execution or reception of one or more additional access operations may be paused. For example, in response to determining the programming failure and vacating at least the first data from the first portion of buffer, the controller of the memory system 305 may refrain from receiving one or more additional access commands from the host system. Additionally, the controller may refrain from performing one or more additional access operations. In this way, the controller of the memory system 305 may ensure that at least the first portion of the buffer is used for managing the second data rather than be allocated for one or more additional operations.

At 345, the second data may be written to the first portion of the buffer. For example, in response to performing the access operation (e.g., and one or more additional access operations to vacate the first data from the first portion of the buffer, the controller of the memory system 305 may write the second data associated with the second access command to the first portion of the buffer. In some examples, the controller may write the second data from the register (e.g., latch) associated with the first block of memory cells to the first portion of the buffer.

At 350, the second data may be written from the first portion of the buffer to a page of a second block of memory cells. For example, the controller of the memory system 305 may select a second block of memory cells (e.g., second block of non-volatile memory cells) to write the second data in response to determining the programming failure. The controller may write the second data from the first portion of the buffer to a page of the second block of the memory device in response to selecting the second block of memory cells. In some examples, prior to writing the second data to the page of the second block of memory cells, the controller may write the second data from the first portion of the buffer to a register (e.g., latch) associated with the second block and then write the second data from the register associated with the second block to the page of the second block.

Further, the controller of the memory system 305 may write the second data to the page of the second block that directly corresponds (e.g., in numbering) to the location of the page of the first block. As an illustrative example, the controller may determine that the programming failure occurred at page 12 of the first block of memory cells. As such, the controller of the memory device may write the second data to page 12 of the second block of memory cells.

At 355, data from one or more pages of the first block may be written to one or more pages of the second block. In some examples, in response to determining the programming failure of the page of the first block and writing the second data to the second block, the controller of the memory system 305 may perform a maintenance operation to write the data from one or more pages of the first block preceding the page of the first block to the second block. Such maintenance operations may include one of a wear leveling operation, a garbage collection operation, a relocation operation, or a refresh operation.

In some other examples, the controller of the memory system 305 may be configured to move the data from the one or more pages preceding the first to one or more pages preceding the page of the second block in descending or ascending order. For example, in response to writing the second data from the first portion of the buffer to the page of the second block, the controller of the memory device may release (e.g., erase, vacate, remove) the second data from the first portion of the buffer, write, to the first portion of the buffer, third data from a first page of the one or more pages preceding the page of first block of memory cells, and write the third data from the first portion of the buffer to a first page of the second block. In such examples, the first page of the first block may directly precede the page (e.g., the identified programming failure page) of the first block. Likewise, the first page of the second block may directly precede the page of the second block (e.g., the page that the second data was written to.

Continuing the illustrative example at 350, in response to writing the second data to page 12 of the second block, the controller of the memory system 305 may be configured to move the data from the one or more pages preceding page 12 of the first block (e.g., move data from pages 1-11 of the first block) to one or more pages of the preceding page 12 of the second block (e.g., move data to pages 1-11 of the second block). To facilitate such operations, the controller of the memory device may be configured to temporarily store the data in the one or more pages preceding page 12 of the first block in the first portion of the buffer. For example, the controller may write the data from page 11 of the first block to the first portion of the buffer, write such data from the first portion of the buffer to page 11 of the second block, and release the data of page 11 from the first portion of the buffer. The controller may continue such operations in descending order (e.g., data from page 10 is moved, then data from page 9, and so on) until all the data from the first block is transferred to corresponding pages of the second block. Alternatively, the controller may be configured to perform such operations in ascending order. That is, in response to writing the data from page 12 of the first block to the page 12 of the second block, the controller may write the data from page 1 of the first block, to the first portion of the buffer and write such data from the first portion of the buffer to page 1 of the second block. The controller may continue such operations until the data from the one or more pages preceding the page 12 (e.g., identified page associated with the programming failure) is written to corresponding pages of the second block.

Figure 4:
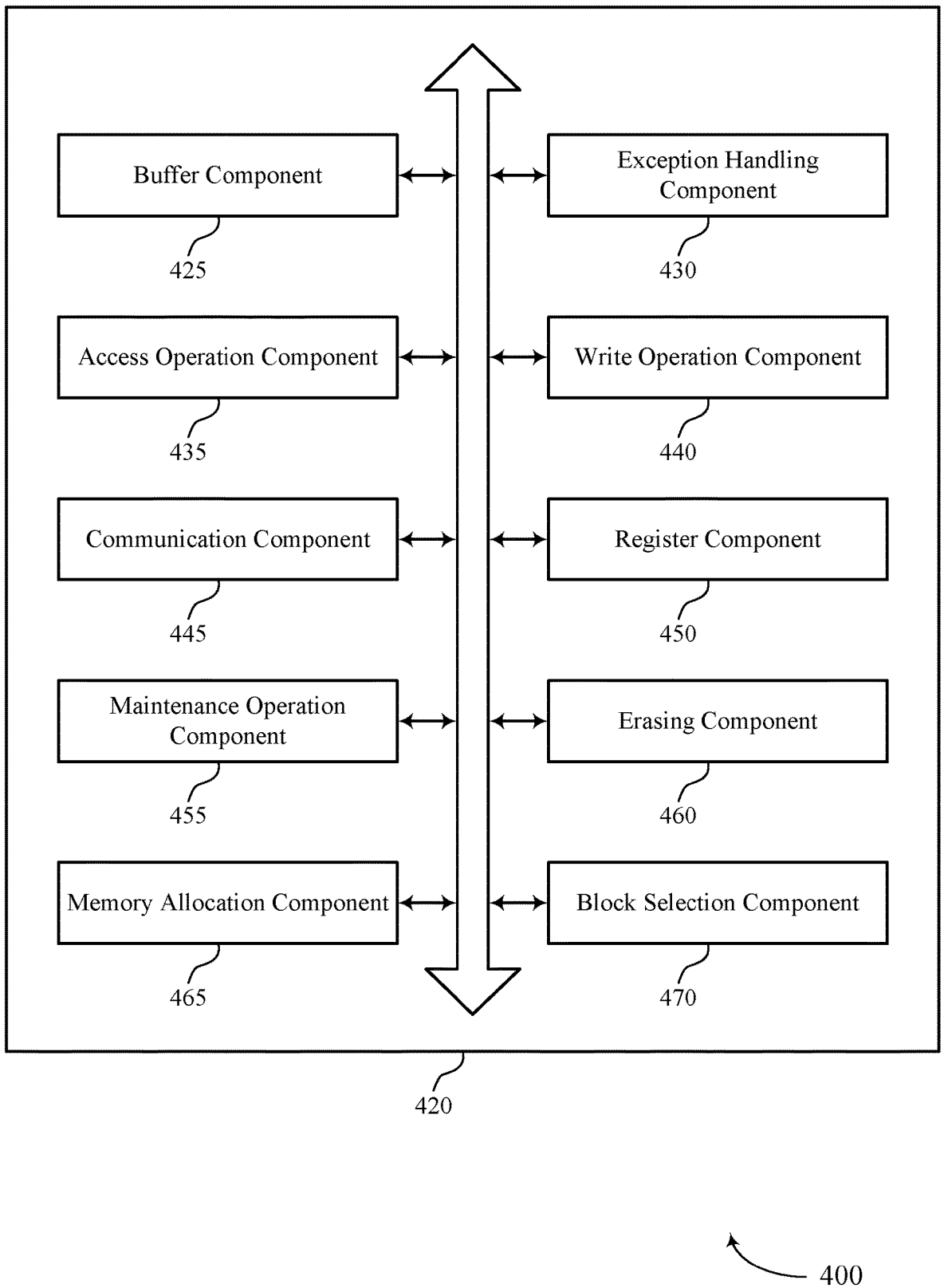
FIG. 4 illustrates a block diagram of a memory system that supports techniques for managing memory exception handling in accordance with examples as disclosed herein.

FIG. 4 illustrates a block diagram 400 of a memory system 420 that supports techniques for managing memory exception handling in accordance with examples as disclosed herein. The memory system 420 may be an example of aspects of a memory system as described with reference to FIGS. 1 through 3. The memory system 420, or various components thereof, may be an example of means for performing various aspects of techniques for managing memory exception handling as described herein. For example, the memory system 420 may include a buffer component 425, an exception handling component 430, an access operation component 435, a write operation component 440), a communication component 445, a register component 450), a maintenance operation component 455, an erasing component 460, a memory allocation component 465, a block selection component 470, or any combination thereof. Each of these components may communicate, directly or indirectly, with one another (e.g., via one or more buses).

The buffer component 425 may be configured as or otherwise support a means for writing first data associated with a first access command to a first portion of a buffer of a memory device, the first portion of the buffer allocated for the first access command. The exception handling component 430 may be configured as or otherwise support a means for determining a programming failure to write second data to a page of a first block of the memory device, the second data associated with a second access command. The access operation component 435 may be configured as or otherwise support a means for performing an access operation associated with the first access command to vacate the first data from the first portion of the buffer in response to determining the programming failure of the second data associated with the second access command. In some examples, the buffer component 425 may be configured as or otherwise support a means for writing the second data associated with the second access command to the first portion of the buffer based at least in part on performing the access operation. The write operation component 440 may be configured as or otherwise support a means for writing the second data from the first portion of the buffer to a page of a second block of the memory device based at least in part on writing the second data to the first portion of the buffer.

In some examples, the communication component 445 may be configured as or otherwise support a means for receiving the second access command to write the second data to the page of the first block.

In some examples, the register component 450 may be configured as or otherwise support a means for writing the second data to a register of the memory device in response to the programming failure. In some examples, the buffer component 425 may be configured as or otherwise support a means for writing the second data from the register to the first portion of the buffer.

In some examples, the maintenance operation component 455 may be configured as or otherwise support a means for writing data from one or more pages of the first block preceding the page of the first block to the second block based at least in part on a maintenance operation, the page of the first block being determined to include the programming failure.

In some examples, the maintenance operation is one of a wear leveling operation, garbage collection operation, relocation operation, or refresh operation.

In some examples, the erasing component 460 may be configured as or otherwise support a means for releasing the second data from the first portion of the buffer based at least in part on writing the second data from the first portion of the buffer to the page of the second block. In some examples, the buffer component 425 may be configured as or otherwise support a means for writing, to the first portion of the buffer, third data from a first page of one or more pages preceding the page of the first block, the page of the first block being determined to include the programming failure. In some examples, the write operation component 440 may be configured as or otherwise support a means for writing the third data from the first portion of the buffer to a first page of the second block. In some examples, the first page of the first block directly precedes the page of the first block and the first page of the second block directly precedes the page of the second block.

In some examples, the access operation component 435 may be configured as or otherwise support a means for refraining from performing one or more additional access operations based at least in part on determining the programming failure of the page of the first block.

In some examples, the communication component 445 may be configured as or otherwise support a means for refraining from receiving one or more additional access commands based at least in part on determining the programming failure of the page of the first block.

In some examples, the access operation component 435 may be configured as or otherwise support a means for performing one or more additional access operations to vacate data from the buffer in response to determining the programming failure of the second data associated with the second access command.

In some examples, the memory allocation component 465 may be configured as or otherwise support a means for allocating the first portion of the buffer to write the second data based at least in part on performing the access operation, where writing the second data to the first portion of the buffer is based at least in part on allocating the first portion of the buffer.

In some examples, the block selection component 470 may be configured as or otherwise support a means for selecting the second block from the memory device based at least in part on determining the programming failure, where writing the second data from the first portion of the buffer to the page of the second block is based at least in part on selecting the second block.

In some examples, the buffer is volatile memory. In some examples, the first block and the second block are non-volatile blocks.

Figure 5:
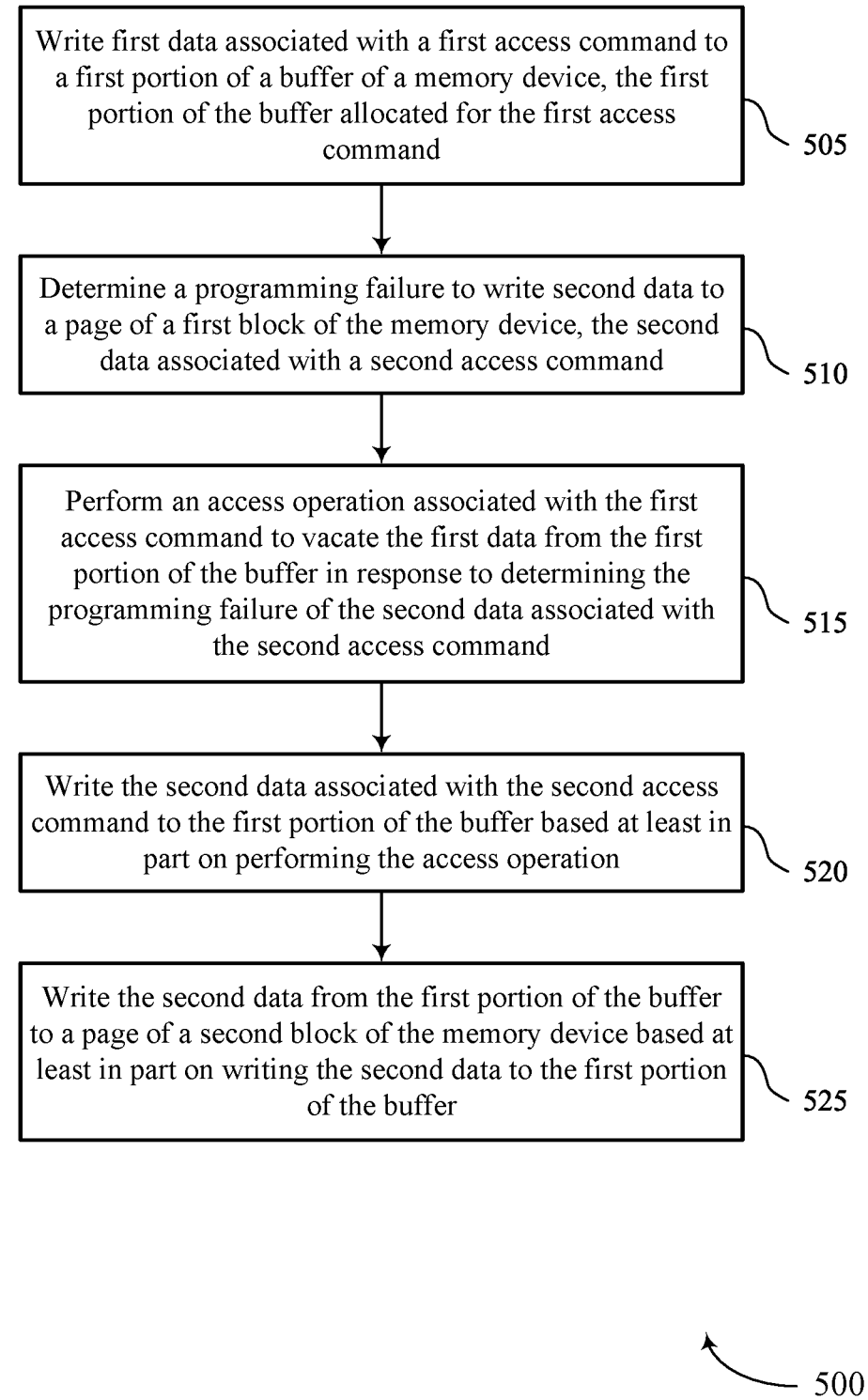
FIG. 5 illustrates a flowchart showing a method or methods that support techniques for managing memory exception handling in accordance with examples as disclosed herein.

FIG. 5 illustrates a flowchart showing a method 500 that supports techniques for managing memory exception handling in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include writing first data associated with a first access command to a first portion of a buffer of a memory device, the first portion of the buffer allocated for the first access command. The operations of 505 may be performed in accordance with examples as disclosed herein. In some examples, aspects of the operations of 505 may be performed by a buffer component 425 as described with reference to FIG. 4.

At 510, the method may include determining a programming failure to write second data to a page of a first block of the memory device, the second data associated with a second access command. The operations of 510 may be performed in accordance with examples as disclosed herein. In some examples, aspects of the operations of 510 may be performed by an exception handling component 430 as described with reference to FIG. 4.

At 515, the method may include performing an access operation associated with the first access command to vacate the first data from the first portion of the buffer in response to determining the programming failure of the second data associated with the second access command. The operations of 515 may be performed in accordance with examples as disclosed herein. In some examples, aspects of the operations of 515 may be performed by an access operation component 435 as described with reference to FIG. 4.

At 520, the method may include writing the second data associated with the second access command to the first portion of the buffer based at least in part on performing the access operation. The operations of 520 may be performed in accordance with examples as disclosed herein. In some examples, aspects of the operations of 520 may be performed by a buffer component 425 as described with reference to FIG. 4.

At 525, the method may include writing the second data from the first portion of the buffer to a page of a second block of the memory device based at least in part on writing the second data to the first portion of the buffer. The operations of 525 may be performed in accordance with examples as disclosed herein. In some examples, aspects of the operations of 525 may be performed by a write operation component 440 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for writing first data associated with a first access command to a first portion of a buffer of a memory device, the first portion of the buffer allocated for the first access command: determining a programming failure to write second data to a page of a first block of the memory device, the second data associated with a second access command: performing an access operation associated with the first access command to vacate the first data from the first portion of the buffer in response to determining the programming failure of the second data associated with the second access command: writing the second data associated with the second access command to the first portion of the buffer based at least in part on performing the access operation: and writing the second data from the first portion of the buffer to a page of a second block of the memory device based at least in part on writing the second data to the first portion of the buffer.

Aspect 2: The method, apparatus, or non-transitory computer-readable medium of aspect 1, further including operations, features, circuitry, logic, means, or instructions, or any combination thereof for receiving the second access command to write the second data to the page of the first block.

Aspect 3: The method, apparatus, or non-transitory computer-readable medium of any of aspects 1 through 2, further including operations, features, circuitry, logic, means, or instructions, or any combination thereof for writing the second data to a register of the memory device in response to the programming failure and writing the second data from the register to the first portion of the buffer.

Aspect 4: The method, apparatus, or non-transitory computer-readable medium of any of aspects 1 through 3, further including operations, features, circuitry, logic, means, or instructions, or any combination thereof for writing data from one or more pages of the first block preceding the page of the first block to the second block based at least in part on a maintenance operation, the page of the first block being determined to include the programming failure.

Aspect 5: The method, apparatus, or non-transitory computer-readable medium of aspect 4, where the maintenance operation is one of a wear leveling operation, garbage collection operation, relocation operation, or refresh operation.

Aspect 6: The method, apparatus, or non-transitory computer-readable medium of any of aspects 1 through 5, further including operations, features, circuitry, logic, means, or instructions, or any combination thereof for releasing the second data from the first portion of the buffer based at least in part on writing the second data from the first portion of the buffer to the page of the second block: writing, to the first portion of the buffer, third data from a first page of one or more pages preceding the page of the first block, the page of the first block being determined to include the programming failure: and writing the third data from the first portion of the buffer to a first page of the second block.

Aspect 7: The method, apparatus, or non-transitory computer-readable medium of aspect 6, where the first page of the first block directly precedes the page of the first block and the first page of the second block directly precedes the page of the second block.

Aspect 8: The method, apparatus, or non-transitory computer-readable medium of any of aspects 1 through 7, further including operations, features, circuitry, logic, means, or instructions, or any combination thereof for refraining from performing one or more additional access operations based at least in part on determining the programming failure of the page of the first block.

Aspect 9: The method, apparatus, or non-transitory computer-readable medium of any of aspects 1 through 8, further including operations, features, circuitry, logic, means, or instructions, or any combination thereof for refraining from receiving one or more additional access commands based at least in part on determining the programming failure of the page of the first block.

Aspect 10: The method, apparatus, or non-transitory computer-readable medium of any of aspects 1 through 9, further including operations, features, circuitry, logic, means, or instructions, or any combination thereof for performing one or more additional access operations to vacate data from the buffer in response to determining the programming failure of the second data associated with the second access command.

Aspect 11: The method, apparatus, or non-transitory computer-readable medium of any of aspects 1 through 10, further including operations, features, circuitry, logic, means, or instructions, or any combination thereof for allocating the first portion of the buffer to write the second data based at least in part on performing the access operation, where writing the second data to the first portion of the buffer is based at least in part on allocating the first portion of the buffer.

Aspect 12: The method, apparatus, or non-transitory computer-readable medium of any of aspects 1 through 11, further including operations, features, circuitry, logic, means, or instructions, or any combination thereof for selecting the second block from the memory device based at least in part on determining the programming failure, where writing the second data from the first portion of the buffer to the page of the second block is based at least in part on selecting the second block.

Aspect 13: The method, apparatus, or non-transitory computer-readable medium of any of aspects 1 through 12, where the buffer is volatile memory.

Aspect 14: The method, apparatus, or non-transitory computer-readable medium of any of aspects 1 through 13, where the first block and the second block are non-volatile blocks.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
      write first data associated with a first access command to a first portion of a buffer of the memory device, the first portion of the buffer allocated for the first access command;
      determine a programming failure to write second data to a page of a first block of the memory device, the second data associated with a second access command;
      perform an access operation associated with the first access command to vacate the first data from the first portion of the buffer in response to determining the programming failure of the second data associated with the second access command;
      write the second data associated with the second access command to the first portion of the buffer based at least in part on performing the access operation; and
      write the second data from the first portion of the buffer to a page of a second block of the memory device based at least in part on writing the second data to the first portion of the buffer.

2. The apparatus of claim 1, wherein the controller is further configured to cause the apparatus to:
   receive the second access command to write the second data to the page of the first block.

3. The apparatus of claim 1, wherein the controller is further configured to cause the apparatus to:
   write the second data to a register of the memory device in response to the programming failure; and
   write the second data from the register to the first portion of the buffer.

4. The apparatus of claim 1, wherein the controller is further configured to cause the apparatus to:
   write data from one or more pages of the first block preceding the page of the first block to the second block based at least in part on a maintenance operation, the page of the first block being determined to include the programming failure.

5. The apparatus of claim 4, wherein the maintenance operation is one of a wear leveling operation, garbage collection operation, relocation operation, or refresh operation.

6. The apparatus of claim 1, wherein the controller is further configured to cause the apparatus to:
release the second data from the first portion of the buffer based at least in part on writing the second data from the first portion of the buffer to the page of the second block;
write, to the first portion of the buffer, third data from a first page of one or more pages preceding the page of the first block, the page of the first block being determined to include the programming failure; and
write the third data from the first portion of the buffer to a first page of the second block.

7. The apparatus of claim 6, wherein the first page of the first block directly precedes the page of the first block and the first page of the second block directly precedes the page of the second block.

8. The apparatus of claim 1, wherein the controller is further configured to cause the apparatus to:
refrain from performing one or more additional access operations based at least in part on determining the programming failure of the page of the first block.

9. The apparatus of claim 1, wherein the controller is further configured to cause the apparatus to:
refrain from receiving one or more additional access commands based at least in part on determining the programming failure of the page of the first block.

10. The apparatus of claim 1, wherein the controller is further configured to cause the apparatus to:
perform one or more additional access operations to vacate data from the buffer in response to determining the programming failure of the second data associated with the second access command.

11. The apparatus of claim 1, wherein the controller is further configured to cause the apparatus to:
allocate the first portion of the buffer to write the second data based at least in part on performing the access operation, wherein writing the second data to the first portion of the buffer is based at least in part on allocating the first portion of the buffer.

12. The apparatus of claim 1, wherein the controller is further configured to cause the apparatus to:
select the second block from the memory device based at least in part on determining the programming failure, wherein writing the second data from the first portion of the buffer to the page of the second block is based at least in part on selecting the second block.

13. The apparatus of claim 1, wherein the buffer is volatile memory.

14. The apparatus of claim 1, wherein the first block and the second block are non-volatile blocks.

15. A non-transitory computer-readable medium storing code comprising instructions which, when executed by a processor of an electronic device, cause the electronic device to:
write first data associated with a first access command to a first portion of a buffer of a memory device, the first portion of the buffer allocated for the first access command;
determine a programming failure to write second data to a page of a first block of the memory device, the second data associated with a second access command;
perform an access operation associated with the first access command to vacate the first data from the first portion of the buffer in response to determining the programming failure of the second data associated with the second access command;
write the second data associated with the second access command to the first portion of the buffer based at least in part on performing the access operation; and
write the second data from the first portion of the buffer to a page of a second block of the memory device based at least in part on writing the second data to the first portion of the buffer.

16. The non-transitory computer-readable medium of claim 15, wherein the instructions, when executed by the processor of the electronic device, further cause the electronic device to:
write the second data to a register of the memory device in response to the programming failure; and
write the second data from the register to the first portion of the buffer.

17. The non-transitory computer-readable medium of claim 15, wherein the instructions, when executed by the processor of the electronic device, further cause the electronic device to:
write data from one or more pages of the first block preceding the page of the first block to the second block based at least in part on a maintenance operation, the page of the first block being determined to include the programming failure.

18. The non-transitory computer-readable medium of claim 17, wherein the maintenance operation is one of a wear leveling operation, garbage collection operation, relocation operation, or refresh operation.

19. The non-transitory computer-readable medium of claim 15, wherein the instructions, when executed by the processor of the electronic device, further cause the electronic device to:
release the second data from the first portion of the buffer based at least in part on writing the second data from the first portion of the buffer to the page of the second block;
write, to the first portion of the buffer, third data from a first page of one or more pages preceding the page of the first block, the page of the first block being determined to include the programming failure; and
write the third data from the first portion of the buffer to a first page of the second block.

20. A method, comprising:
writing first data associated with a first access command to a first portion of a buffer of a memory device, the first portion of the buffer allocated for the first access command;
determining a programming failure to write second data to a page of a first block of the memory device, the second data associated with a second access command;
performing an access operation associated with the first access command to vacate the first data from the first portion of the buffer in response to determining the programming failure of the second data associated with the second access command;
writing the second data associated with the second access command to the first portion of the buffer based at least in part on performing the access operation; and writing the second data from the first portion of the buffer to a page of a second block of the memory device based at least in part on writing the second data to the first portion of the buffer.

* * * * *